(12) United States Patent
Winter et al.

(10) Patent No.: US 7,166,819 B2
(45) Date of Patent: Jan. 23, 2007

(54) DEVICE TO BE MOUNTED ON THE FRONT PART OF A MOTOR VEHICLE

(75) Inventors: Klaus Winter, Schwieberdingen (DE); Sabine Koerber, Ludwigsburg (DE); Bernhard Lucas, Besigheim (DE); Andreas Reichert, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/492,052

(22) PCT Filed: Sep. 17, 2002

(86) PCT No.: PCT/DE02/03485

§ 371 (c)(1),
(2), (4) Date: Dec. 22, 2004

(87) PCT Pub. No.: WO03/033318

PCT Pub. Date: Apr. 24, 2003

(65) Prior Publication Data
US 2005/0115943 A1    Jun. 2, 2005

(30) Foreign Application Priority Data
Oct. 6, 2001    (DE)    ................................. 101 49 337

(51) Int. Cl.
*B60L 1/02*    (2006.01)
(52) U.S. Cl. ........................ 219/202; 219/220; 342/70
(58) Field of Classification Search ................ 219/202, 219/201, 209, 544; 340/435, 436
See application file for complete search history.

(56) References Cited

U.S. PATENT DOCUMENTS

| | | | | |
|---|---|---|---|---|
| 1,951,902 A | * | 3/1934 | Dempsey | ..................... 219/220 |
| 4,728,775 A | * | 3/1988 | Van Straten | ................. 219/202 |
| 5,454,442 A | * | 10/1995 | Labuhn et al. | .............. 180/169 |
| 5,844,471 A | * | 12/1998 | Daniel | ......................... 340/436 |
| 6,563,086 B1 | * | 5/2003 | Meirndorf et al. | .......... 219/220 |
| 6,674,392 B1 | * | 1/2004 | Schmidt et al. | ............... 342/70 |
| 6,710,302 B1 | * | 3/2004 | Rennick | ..................... 219/202 |

FOREIGN PATENT DOCUMENTS

| | | |
|---|---|---|
| DE | 197 24 320 | 12/1998 |
| DE | 198 50 639 | 5/1999 |
| DE | 19963004 A1 * | 6/2001 |
| JP | 2000 046948 | 2/2000 |
| WO | WO 01 68425 | 9/2001 |
| WO | WO 02 21636 | 3/2002 |

OTHER PUBLICATIONS

"Automobile Electrical Systems, Automobile Electronic Systems", Vieweg-Verlag, 3rd edition, 1998, pp. 263 ff.

* cited by examiner

*Primary Examiner*—Robin Evans
*Assistant Examiner*—Vinod Patel
(74) *Attorney, Agent, or Firm*—Kenyon & Kenyon LLP

(57) ABSTRACT

A device for a front-end component part of a motor vehicle, behind which a radar transmitter/receiver is fastened in such a way that the latter is not visible from in front. In winterish surroundings, ice and snow deposits may occur on the front component part, whereby the functionability of the radar sensor may be impaired. It is possible to remove and/or prevent these precipitation deposits on the front component part.

2 Claims, 4 Drawing Sheets

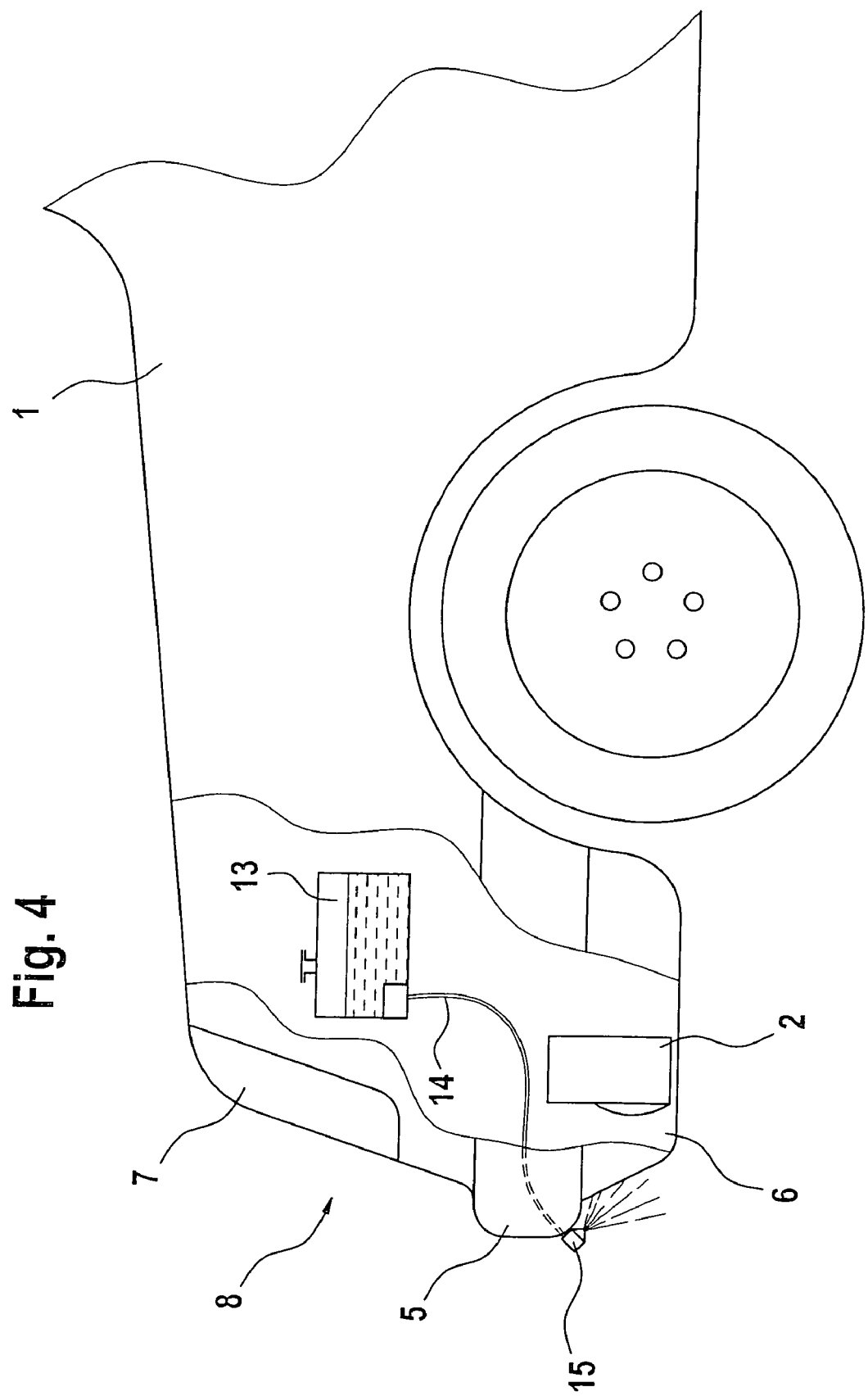

DEVICE TO BE MOUNTED ON THE FRONT PART OF A MOTOR VEHICLE

FIELD OF THE INVENTION

The present invention relates to a device for a front-end component part of a motor vehicle, behind which a radar transmitter/receiver is fastened in such a way that the latter is not visible from in front. In winterish surroundings, ice and snow deposits may occur on the front component, whereby the functionability of the radar sensor may be impaired. According to the present invention, it is possible to remove and/or prevent these precipitation deposits on the front component.

BACKGROUND INFORMATION

German Patent Application No. DE 197 24 320 describes a method for producing an heatable antenna lens. A heatable antenna lens is described that is made of a dielectric substance, which has inside of it an array of electrical conductors, the electrically conductive array not lying in a plane.

On page 263 ff, design and operation of headlight cleaning systems are described from the book, "Automobile Electrical Systems, Automobile Electronic Systems", Vieweg-Verlag, 3rd edition, 1998. Such headlight cleaning systems have the objective of removing the dirt on the lenses of the main headlights. The embodiment variant of the high-pressure washing systems described stands out in that it may be used both for glass lenses and for plastic lenses. The cleaning effect is determined mainly by the cleaning impulse of the water drops. As the important variables of the cleaning impulses, the distance between nozzle and lens, the size, the angle of incidence and the speed of incidence of the water drops, as well as the quantity of the water are named.

SUMMARY OF THE INVENTION

An essence of the present invention is a device for a front cover part of a motor vehicle. This device is advantageously in in a position to remove and/or prevent precipitation deposits on front cover parts of a motor vehicle, in liquid or solid form.

It is particularly advantageous that, as a front cover part, a bumper, a spoiler, a radiator cover, the engine hood or an illuminating device is used.

Advantageously, the precipitation deposits are removed and/or prevented by a direct or an indirect supply of heat.

In a particularly advantageous manner, the direct supply of heat is performed with the aid of heating wires which are built into the front cover part.

By electrically resistive heating up of these heating wires, at least the region of the front cover part, which is penetrated by the electromagnetic waves of a radar sensor, is heated, whereby precipitation deposits in the form of snow or ice are removed and/or prevented.

An indirect supply of heat is advantageously given by an air or liquid current of the engine waste heat that is transported to the region of the front part which is penetrated by the electromagnetic waves of a radar sensor. A great advantage of this variant of the embodiment is that the waste engine heat, which is of necessity produced in the vehicle, but is lost, is used to de-ice the front part. The transport of the engine waste heat, from the engine region to the front part, takes place through an air channel, in that, advantageously, a fan having a drive provided in the air channel aspirates the air heated by the engine and conducts it in a controlled manner to the region of the front part that is to be de-iced, or rather to be protected from icing up. Likewise, the indirect heating of the front component part may take place with the aid of a liquid flow. In this connection, it is conceivable that a water-filled hose system removes the engine heat and passes it on in a controlled manner to the front component part. For this, advantageously, the cooling liquid circulation of the engine is used, in that a part of the heated cooling liquid is not taken directly to the radiator, but is first conducted past the front component part.

It is especially advantageous to select the surface of the front component part in the region that is penetrated by electromagnetic waves of the radar sensor in such a way that precipitation deposits are prevented from the start.

This is done advantageously by using a material that has a sufficiently great contact angle or wetting angle, when in wetting equilibrium, so that water is repelled. This material may either be only applied to the surface of the front component part in a thin layer, or the front component part may partially or solidly be made of this material.

It is particularly advantageous if a substance such as polytetrafluoroethylene or a perfluorinated silane is used for this.

In addition, it is advantageous if the precipitation deposits on the front component part are removed and/or prevented by using an antifreeze liquid. This happens advantageously by providing spray nozzles in the surroundings of the region of the front component part, which is penetrated by electromagnetic waves of the radar sensor. For this purpose, the spray nozzles are connected, with the aid of a hose, to the output side of a pump, which in turn is connected to a storage container, and whereby an antifreeze liquid is sprayed onto the front component part.

As the storage container for the antifreeze, one may advantageously use the storage container that is already present for the windshield washing system.

In addition, combinations of the devices shown here are also conceivable, so that a precipitation deposit in liquid or solid form may take place (be removed and/or prevented) in the region of a front cover part, which is penetrated by electromagnetic radiation of a radar sensor, by the cooperation of several of the variants presented here.

BRIEF DESCRIPTION OF THE DRAWINGS

FIG. 4 shows a fourth exemplary embodiment of a device according to the present invention.

DETAILED DESCRIPTION

Figure 1:
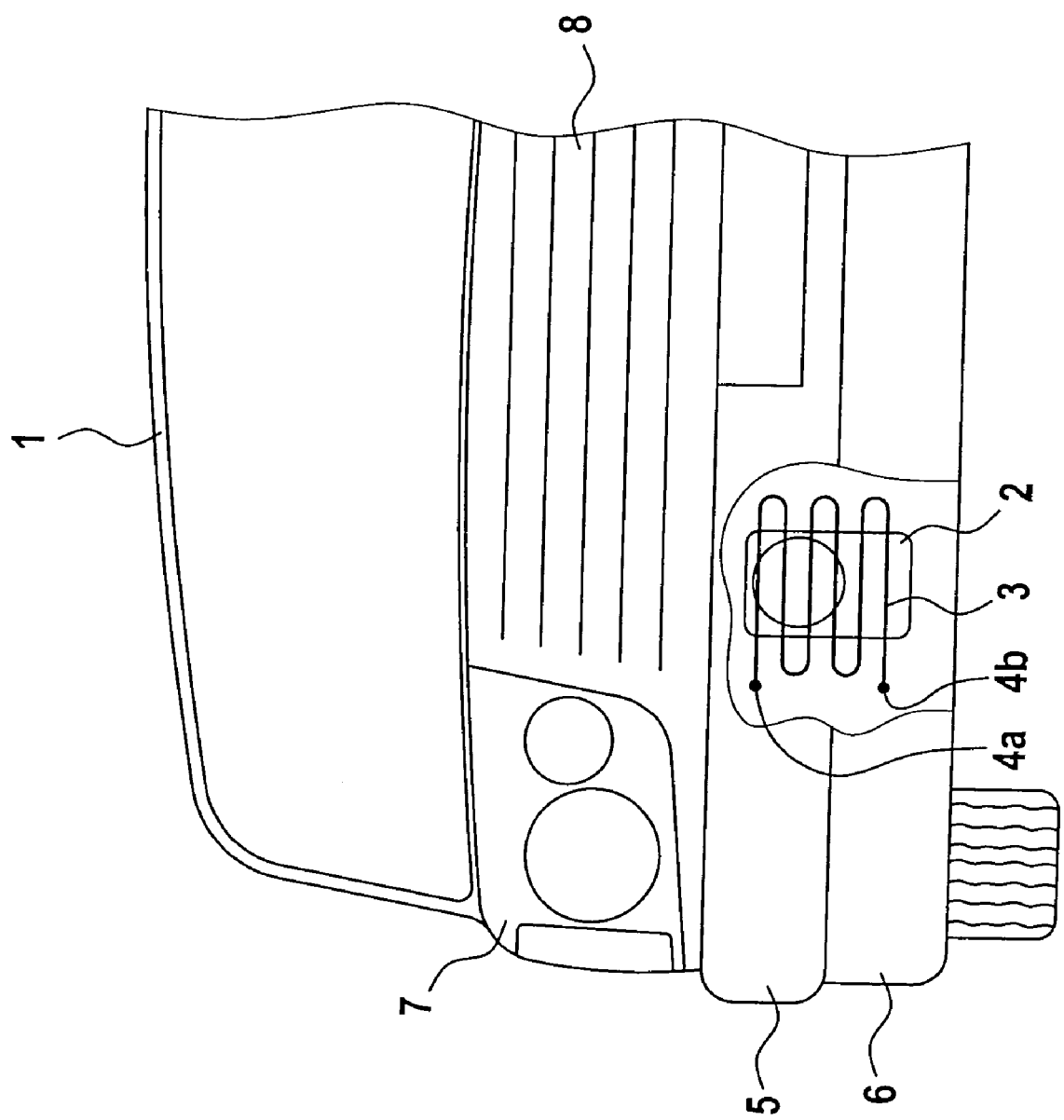
FIG. 1 shows a first exemplary embodiment of a device according to the present invention.

FIG. 1 shows a motor vehicle 1 in a front view. Front component parts may also be recognized. Going into details, these are lighting devices 7, a radiator cover 8, front bumper 5 and a front spoiler 6. In addition, a radar sensor 2, for transmitting and receiving microwave radiation is drawn in. This radar sensor is built in, in this exemplary embodiment, behind the bumper and the front spoiler. According to the present invention, it is, however, also possible to install such a sensor in illuminating device 7 or behind radiator grille 8. It would also be conceivable to integrate the radar sensor into the engine hood. Moreover, an electrical heating wire 3 is provided, which is inserted into one or more front component parts 5, 6. This electrical heating wire 3 has two connecting points 4a, 4b to which a control or regulating device may be connected, in order to operate the heating wire in a suitable manner. If a current is flowing through electrical heating wire 3, the front component part, into which the electrical heating wire is built in, is heated. The heating of front component parts 5,6,7,8 is to be designed in such a way, in this context, that deposits of precipitations, especially in the form of snow or ice, is prevented, and already existing deposits of precipitation deposits may be removed. In this way, the front component part may be kept free from snow and ice even in winterish surroundings, whereby functional impairment of the radar sensor is avoided.

Figure 2:
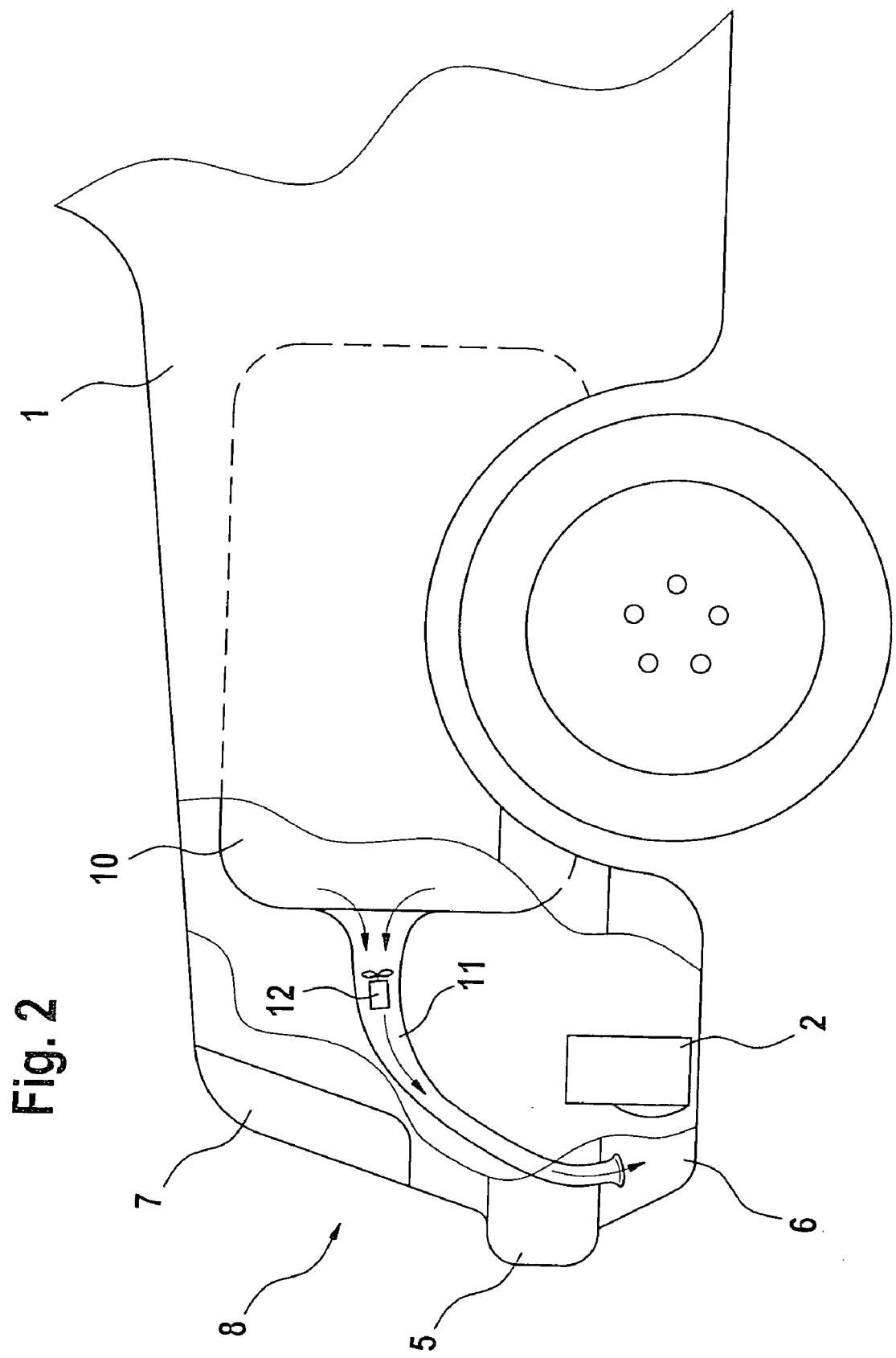
FIG. 2 shows a second exemplary embodiment of a device according to the present invention.

FIG. 2 shows a motor vehicle 1 in a side view. This drawing shows a second exemplary embodiment of the device according to the present invention. The side view of vehicle 1 is limited to the front part of the vehicle, the left front fender being shown. In this view too, various front component parts, behind which radar sensor 2 may be positioned, are shown. Thus, front bumper 5, forward front spoiler 6 as well as a front illuminating unit 7 are shown in detail. Furthermore, radiator cover 8 should be mentioned, which cannot be recognized in this representation. As a part of vehicle 1, engine 10 is drawn in, which is in particular developed as an internal combustion engine. The waste heat which this driving device generates, is aspirated with the aid of an air line channel 11 in the engine compartment, and transported further by a fan having drive 12. This air duct channel 11 is made in such a way that its air discharge opening directs a flow towards front cover part 5,6,7,8. In this context, the front cover part has the hot engine waste heat flowing at it in such a way that, in particular, the region, through which the electromagnetic radiation of radar sensor 2 penetrates, is heated up. Because of the heating, especially of the region of the front component part which is penetrated by the radar radiation, it is possible to remove precipitation deposits in the form of snow or ice, and to prevent a new deposit.

Figure 3:
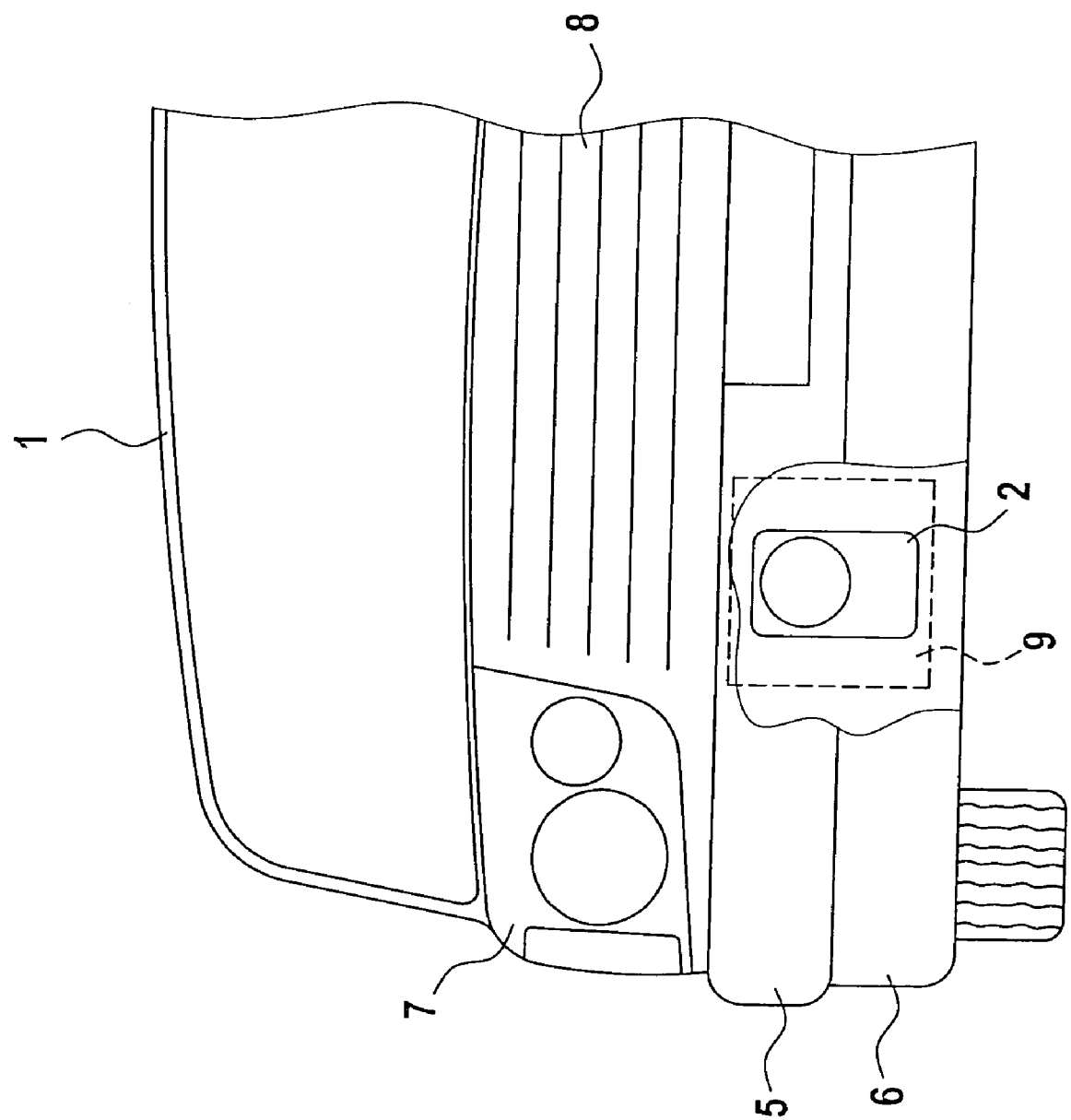
FIG. 3 shows a third exemplary embodiment of a device according to the present invention.

FIG. 3 shows an additional variant of an embodiment of the present invention. One may see again a motor vehicle 1 in a front view. At the front end this has so-called front component parts, especially in the form of a bumper 5, of a front spoiler 6, in the form of two symmetrically situated illuminating devices 7 as well as a radiator grille 8. In addition, at the front end of vehicle 1, a radar sensor 2 is provided, which transmits and receives radar radiation, and which may particularly be used for adaptive cruise control. For esthetic reasons, the radar sensor is mounted behind one or several of the front component parts 5,6,7,8 named. In this context, it should be mentioned that the front component parts 5,6,7,8 must be made of a material that is permeable to electromagnetic waves and does not absorb them. According to the present invention, radar device 2, which in this example is situated behind front bumper 5 and front spoiler 6, can also be situated behind another front component part, such as radiator cover 8, one of two illuminating devices 7 or the engine hood. In the exemplary embodiment shown here, the front component part, or rather front component parts 5,6, behind which radar sensor 2 is hidden away, are coated with a special surface. This special surface is applied in at least the region of the front component part which is penetrated by the electromagnetic radiation of radar sensor 2. This special surface, which is applied to front component part 5,6,7,8, in the exemplary embodiment shown in FIG. 3, has a broken line 9 around it as an edge. Of course, this special surface may also be applied on a greater region or over the entire front component part. Advantageously, in the case of this special surface, one may use a surface material which has the property of repelling water or substances similar to water, in that this surface material forms a sufficiently great contact angle or wetting angle. As a large contact angle, in this case, one would understand an angle of at least 90°. The contact angle or the wetting angle is the angle that forms during wetting equilibrium at the edge of a drop on a solid surface between the drop surface and the solid surface. Furthermore, this material should make it possible to be applied to plastics in a simple and cost-effective way, especially on plastics which are used for body elements in automobile construction. As surface materials, particularly substances like perfluorinated silanes or polytetrafluoroethylene (Teflon) are suitable.

FIG. 4 shows a fourth exemplary embodiment of the device according to the present invention. Here too, as in FIG. 2, the front side view of a motor vehicle 1 is shown. One may recognize here the front component parts, such as front bumper 5, front spoiler 6, front illuminating devices 7, radiator grille 8, as well as the engine hood that is not visible in this representation. In this exemplary embodiment too, radar sensor 2 is mounted behind front bumper 5 and front spoiler 6. However, it is also conceivable to position this radar sensor 2 behind a different front cover part, such as the engine hood, an illuminating device 7 or radiator grille 8. The specific embodiment shown for removing and/or preventing precipitation deposits at the region of the front component part, which is penetrated by the radar radiation of radar sensor 2, takes place with the aid of an antifreeze. For this purpose, storage tank 13 is sketched in sketch form, and it includes a feed pump. This feed pump takes the antifreeze fluid from storage tank 13 and conducts it through a supply line 14 to spray nozzle 15. This spray nozzle is advantageously fastened to the front bumper, and is aligned in such a way that the region of the front cover part, that is penetrated by radar radiation, is able to be wetted by the sprayed substance. In the spraying system shown, advantageously a high-pressure system is involved, which applies the antifreeze to the front cover part at a high spraying pressure. Because of the property of the antifreeze that it lowers the melting point, it is possible to de-ice the parts wetted by the antifreeze, and at the same time to remove solid deposits using the effect of the jets. In an advantageous manner, the antifreeze, which may also be made up of a mixture of antifreeze and water, is taken from the storage tank for the headlight washing system and from the storage tank for the window washing system.

In addition, combinations of the devices shown here are also conceivable, so that a precipitation deposit in liquid or solid form may take place in the region of a front cover part, which is penetrated by electromagnetic radiation of a radar sensor, by the cooperation of several of the variants presented here.

What is claimed is:

1. A device for at least one front component part of a motor vehicle comprising:
    an arrangement for at least one of removing and preventing precipitation deposits in at least one of solid and liquid form in an area of a surface of the front component part;
    a radar sensor for adaptive cruise control, wherein the radar sensor is positioned behind the at least one front component part, at least one portion of the front component part being penetrated by electromagnetic waves of the radar sensor; and at least one electrical heating wire built into the at least one portion of the front component part penetrated by electromagnetic waves of the radar sensor, wherein the at least one electrical heating wire provides a direct supply of heat;

wherein the at least one front component part includes at least one of a bumper, a spoiler, a radiator grille, and an illuminating device, and wherein the precipitation deposits are at least one of removed and prevented by the direct supply of heat from the at least one electrical heating wire.

2. The device according to claim 1, wherein the front component part includes a front cover element.

* * * * *